United States Patent Office 2,809,196
Patented Oct. 8, 1957

2,809,196

SYNTHESIS OF PIPERAZINE

William R. Miller, Niagara Falls, N. Y., assignor to E. I. du Pont de Nemours and Company, Wilmington, Del., a corporation of Delaware No Drawing. Application August 30, 1955,
Serial No. 531,596

4 Claims. (Cl. 260—268)

This invention relates to the synthesis of piperazine. More particularly, it relates to the synthesis of piperazine by the reductive cyclization of iminodiacetonitrile.

Henecka, Chem. Ber. 82, 104–112 (1949), has reported the reductive cyclization of N-acetyliminodiacetonitrile over a supported nickel catalyst. Upon hydrolysis of the product, he obtained a 26.5% yield of piperazine. Culver et al., U. S. Patent 2,605,263 (1952), obtained a yield of around 30% of piperazine by the hydrogenation of iminodiacetonitrile, di(cyanomethyl)amine, over an acid-treated Raney catalyst. The equation for the reaction of these investigators may be written as:

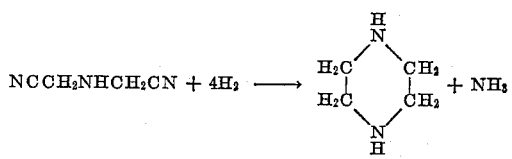

Mosher et al., J. Am. Chem. Soc. 75, 4949–51 (1951), report yields of piperazines as high as 41.5% obtained by low-pressure, reductive cyclization of iminodiacetonitrile or N-substituted iminodiacetonitriles.

An object of the present invention is provision of a new and improved process for the synthesis of piperazine.

Another object is provision for a novel method of forming piperazine from iminodiacetonitrile.

A further object is provision of a method for producing piperazine from iminodiacetonitrile in improved yield.

The above-mentioned and still further objects are achieved in accordance with this invention by a process in which iminodiacetonitrile is reduced over a nickel catalyst at a relatively low temperature in a solution which contains preformed ammonia. The most important variables to be noted in carrying out the process, besides the reactants, are the catalyst, the ratio of catalyst to reactant, the solvent, the pressure and the temperature.

The catalyst for use in the cyclization is nickel, most conveniently in the form of foraminous or Raney nickel. Commercial products in the range of weight ratios between 60:40 and 40:60 Al:Ni are satisfactory although others may be used as well. The catalyst may readily be activated by dissolving some of the aluminum in sodium hydroxide or other caustic solution. The activity of the catalyst is quite specific. Substitution of Raney cobalt for nickel yields diethylenetriamine almost entirely.

The ratio of catalyst to iminodiacetonitrile is also important. If this falls below one gram of nickel per gram of nitrile in batch reaction, the yield declines rapidly. Higher ratios can be used but lead to no particular advantage. An equivalent result is attained in continuous reactions by low space velocities, i. e. about 1–3 volumes of reactant mixture per volume of catalyst per hour.

As reaction solvents inert liquids such as methanol, ethanol, tetrahydrofuran and like alcohols and ethers may be employed. In any case about 5–15% by weight of ammonia should be included in the solvent to improve the yield of piperazine, about 10% being preferred. Liquid ammonia may also be used alone but preferably in batch reactions only.

The concentration of iminodiacetonitrile in the solvent should be rather low, i. e., 5–15% by weight. Around 10% is preferred. Higher concentrations may be employed but only concomitantly with increased pressures.

The pressure employed for the reduction should be rather high, i. e., 3000–5000 p. s. i. g. Around 4000–4500 p. s. i. g. is preferred. The reaction temperature is, on the contrary, rather low. Not above about 75–125° C. should be utilized for best results.

There follow some examples which illustrate the invention in detail. In these examples all percentages are weight percentages.

Example 1

A catalyst was prepared by activating a 6–10 mesh 50–50 Raney nickel (50% aluminum, 50% nickel) in sodium hydroxide until 40% of the aluminum was dissolved. The catalyst was then washed in distilled water until the washings were neutral, dried and stored under hydrogen until used.

790 g. of the catalyst were charged into the one-inch reactor tube of a continuous hydrogenation unit. Hydrogen pressure on the unit was adjusted to 4500 p. s. i. g. and the catalyst heated to 75° C. Conditions were stabilized by pumping ammoniacal methanol through the unit.

A feed mix of 100 g. of iminodiacetonitrile in a mixture of 200 ml. of anhydrous ammonia and 1800 ml. of methanol was pumped through the catalyst at a rate of 1.1 liters per hour. After two hours ammoniacal methanol was pumped through the unit to remove the residual reaction mixture.

Distillation of the product gave two fractions. The first boiled at 125–185° C. and crystallized, on cooling, to a white solid. The second fraction was a yellow liquid boiling at 185–220° C. Careful redistillation of the first fraction gave piperazine, boiling at 139–142° C. (760 mm. of mercury pressure). Redistillation of the second fraction gave diethylenetriamine, boiling at 127–129° C. (60 mm.). Yields were 55 g. (60%) and 34 g. (31%) respectively. Benzoyl derivatives of both compounds were identical with benzoyl derivatives of authentic samples.

Example 2

The reductive cyclization of Example 1 was substantially repeated except that the catalyst had been used for seven previous runs. It was then reactivated by treating with sodium hydroxide solution until hydrogen corresponding to an additional 5% of the aluminum had been evolved. The temperature was 102–112° C. The yields in this case were 55% piperazine and 10% diethylenetriamine.

Example 3

A batch reductive cyclization was carried out by charging to a steel hydrogenation bomb 38 g. of iminodiacetonitrile, 500 ml. of ammonia and 40 g. of nickel catalyst. The catalyst had been prepared by dissolving essentially all the aluminum from a nickel-aluminum alloy. The reduction was run at 95–105° C. at 4000–4500 p. s. i. g. for 4 hours. The bomb was cooled and vented and the product was distilled. There was an 85% yield of piperazine together with a little diethylenetriamine.

Having described my invention, I claim:
1. A process for preparing piperazine which comprises hydrogenating iminodiacetonitrile under a hydrogen pressure of 3000 to 5000 p. s. i. g. at a temperature in the range of about 75° C. to not more than 125° C. in a reaction solvent comprising at least 5% by weight of ammonia in the presence of a Raney nickel catalyst, the concentration of iminodiacetonitrile in the solvent being about 5 to 15% by weight.

2. The process of claim 1 in which the reaction solvent is a member of the group consisting of alcohols and ethers and contains about 10% by weight of ammonia.

3. The process of claim 2 in which the reacton solvent is methanol.

4. A process for preparing piperazine which comprises hydrogenating iminodiacetonitrile under a hydrogen pressure of 3000 to 5000 p. s. i. g. at a temperature in the range of 75° to not more than 125° C. in liquid ammonia in the presence of a Raney nickel catalyst, the concentration of the iminodiacetonitrile in the liquid ammonia being about 5 to 15% by weight.

References Cited in the file of this patent

UNITED STATES PATENTS 2,605,263   Culver et al. _____ July 29, 1952